United States Patent Office
3,461,112
Patented Aug. 12, 1969

3,461,112
AZOBIS(2,2',4,4',6,6'-HEXANITROBIPHENYL)
Darrell V. Sickman, Washington, D.C., and Mortimer J. Kamlet, Silver Spring, Md., assignors to the United States of America as represented by the Secretary of the Navy
No Drawing. Filed Dec. 27, 1965, Ser. No. 516,706
Int. Cl. C07c 107/04; C06b 9/00
U.S. Cl. 260—205
9 Claims The invention described herein may be manufactured and used by or for the Government of the United States of America for governmental purposes without the payment of any royalties thereon or therefor.

This invention pertains to a novel energetic compound and more particularly to a novel explosive and a method for its preparation.

There is a continuing need for new explosives which may be used as boosters or initiators. In particular, due to higher and higher speeds in missiles and aircrafts, the need is directed to explosives with good thermal stability.

Accordingly, it is an object of this invention to produce a novel explosive.

It is another object of this invention to produce a thermally stable explosive.

It is a further object to produce an explosive that may be used as either an initiator or a booster.

These and other objects will become more readily apparent from reading the following detail description of the invention.

The objects of this invention are accomplished by producing the compound azobis(2,2',4,4',6,6'-hexanitrobiphenyl). The compound is produced by the following reaction sequence:

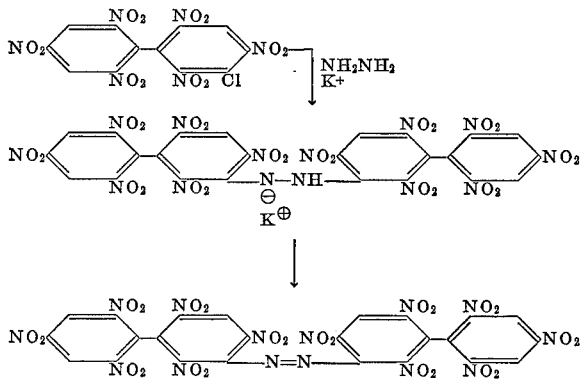

The compound of this invention is generally produced by reacting 3-chloro-2,2',4,4',6,6'-hexanitrobiphenyl, an alkali metal salt of a weak acid, and hydrazine to produce an alkali metal salt of 3,3'-dipicryl-2,2',4,4',6,6'-hexanitrohydrazobenzene which is ten oxidized to azobis(2,2', 4,4',6,6'-hexanitrobiphenyl). More particularly, chlorohexanitrobiphenyl, an alkali metal salt of a weak acid and hydrazine are reacted at room temperature or higher in a solvent in which they are mutually soluble, e.g., a mixture of tetrahydrofuran and a lower alkane, with some heating generally being used to initiate the reaction. The chlorohexanitrobiphenyl is generally used in excess of the stoichiometric amount based on hydrazine, i.e., the mole ratio of chlorohexanitrobiphenyl to hydrazine is greater than 2:1, since the presence of less than the stoichiometric amount of chlorohexanitrobiphenyl may result in lower reaction yields. The alkali metal salt of a weak acid utilized in the process is preferably a carboxylate including; for example, acetates, butyrates, propionates, and the like, with potassium acetate being especially preferred. The hydrazine employed in the process should be anhydrous since the presence of water may produce undesirable side reactions and thus any water previously present should be removed. The 3-chloro-2,2',4,4',6,6'-hexanitrobiphenyl starting material may be obtained by the process disclosed by Dacons, Adolph and Kamlet in a paper published in Tetrahedron volume 19, page 791, which is hereby incorporated by reference.

When the above reaction is completed, the solvent is removed and the alkali metal salt of 3,3'-dipicryl-2,2',4,4', 6,6'-hexanitrohydrazobenzene produced by the reaction is oxidized to azobis(2,2',4,4',6,6'-hexanitrobiphenyl). The oxidation is preferably performed by adding nitric acid to the salt with stirring but it is to be understood that other well known oxidizing agents may be used with equally good results.

The crude azobis(2,2',4,4',6,6'-hexanitrobiphenyl) produced by the oxidation may be purified by recrystallization from either an acetonitrile-tetrahydrofuran mixture or acetone. If the former is used as the solvent, the pure product is recovered by a simple concentration procedure and if the latter is used, the product immediately represents in the form of a microcrystalline acetone solvate which is converted to pure azobis(2,2',4,4',6,6'-hexanitrobiphenyl) by heating at temperatures above about 100° C.

The following examples are illustrative of the invention but they are not to be considered as limiting it in any manner.

Example

A solution containing 7.35 g. (0.075 mole) potassium acetate and 0.72 g. (0.0225 mole) anhydrous hydrazine (prepared by mixing 5 ml. hydrazine monohydrate and 20 g. anhydrous barium oxide into a mealy paste and distilling the anhydrous hydrazine from the paste) in 60 ml. ethanol was added to a solution of 22.9 g. (0.050 mole) of 3-chloro-2,2',4,4',6,6'-hexanitrobiphenyl in 200 ml. of tetrahydrofuran. The solution was stirred for fifteen minutes at 50–55° C. and further stirred for eighteen hours at room temperature.

The solvent was taken off in vacuo on a rotary evaporator, leading to an amorphous black mass which adhered strongly to the walls of the flask. With vigorous stirring, 100 ml. water was added, then 20 ml. concentrated (70%) nitric acid, causing a temperature rise from 25 to 35°. A half-hour's vigorous stirring caused the major portion of the black amorphous mass to break up. Then, with cooling, was added a further 200 ml. concentrated nitric acid. Copious red fumes were evolved as the temperature surged to 65° and the mixture turned red-orange in color. A further two and one-half hours' stirring caused disappearance of the remaining black particles adhering to the walls of the flask, whereupon the mixture was filtered on a fine sintered glass funnel and the product washed exhaustively with water, then with ethanol and with ether. After air-drying, the crude azobis(2,2',4,4',6,6'-hexanitrobiphenyl) a fine brick-red powder discoloring at 270–275° but not melting below 300°, amounted to 16.0 g.

For recrystallization, 6.0 g. of the above material was dissolved in a mixture of 250 ml. acetonitrile and 150 ml. tetrahydrofuran and concentrated. The product precipitated from the hot solution as brick-red crystals (particle size 30–100 microns) and was filtered and washed with ethanol and with ether, then dried in the oven overnight at 150–160°; yield 3.6 g. (49% based on hydrazine).

The compound of this invention may be utilized as a thermally stable booster explosive (substitute for tetryl), or as an initiating explosive in an exploding bridge wire detonator. This explosive further has the advantage that it builds up quite rapidly to full scale detonation velocity and thus it improves the reliability and simultaneity of an exploding bridge wire detonator.

What is claimed is:

1. The compound azobis(2,2',4,4',6,6'-hexanitrobiphenyl).

2. A process for producing the compound of claim 1 which comprises:
   (a) reacting 3-chloro-2,2',4,4'6,6'-hexanitrobiphenyl, an alkali metal salt of a weak acid and hydrazine to produce an alkali metal salt of 3,3'-dipicryl-2,2',4,4',6,6'-hexanitrohydrazobenzene, and
   (b) oxidizing the product of step (a) to produce azobis(2,2',4,4',6,6'-hexanitrobiphenyl).

3. The process of claim 2 wherein the mole ratio of 3-chloro-2,2',4,4',6,6'-hexanitrobiphenyl to hydrazine is greater than about 2:1.

4. The process of claim 3 wherein the reaction of step (a) is performed in a solvent comprising a mixture of tetrahydrofuran and a lower alkanol.

5. The process of claim 4 wherein the lower alkanol is ethanol.

6. The process of claim 4 wherein the oxidation is performed with nitric acid.

7. The process of claim 6 wherein the alkali metal salt of a weak acid is potassium acetate and the lower alkanol is ethanol.

8. The process of claim 4 wherein the azobis(2,2',4,4',6,6'-hexanitrobiphenyl) is recrystallized from a mixture comprising acetonitrile and tetrahydrofuran.

9. The process of claim 4 wherein the azobis(2,2',4,4',6,6'-hexanitrobiphenyl) is recrystallized from acetone.

References Cited

UNITED STATES PATENTS 2,963,507   12/1960   Rudner et al. _____ 260—645 X

LELAND A. SEBASTIAN, Primary Examiner

U.S. Cl. X.R.

149—105; 260—569, 646, 707